US011416912B2

(12) United States Patent
Cahall, Jr. et al.

(10) Patent No.: US 11,416,912 B2
(45) Date of Patent: Aug. 16, 2022

(54) HIGH VOLUME TRANSACTION QUEUEING WITH MACHINE LEARNING

(71) Applicant: Digital River, Inc., Minnetonka, MN (US)

(72) Inventors: Theodore Russell Cahall, Jr., Chanhassen, MN (US); Sandeep Tikoo, Shakopee, MN (US); Ivan Atanasov Atanasov, Chanhassen, MN (US); Scott Michael Sutherland, Minneapolis, MN (US); Ian Holsman, Richmond (AU)

(73) Assignee: DIGITAL RIVER, INC., Minnetonka, MN (US)

( * ) Notice: Subject to any disclaimer, the term of this patent is extended or adjusted under 35 U.S.C. 154(b) by 372 days.

(21) Appl. No.: 15/394,775

(22) Filed: Dec. 29, 2016

(65) Prior Publication Data
US 2017/0330267 A1 Nov. 16, 2017

Related U.S. Application Data

(60) Provisional application No. 62/335,740, filed on May 13, 2016.

(51) Int. Cl.
*G06Q 30/06* (2012.01)
*H04L 43/16* (2022.01)
(Continued)

(52) U.S. Cl.
CPC ..... *G06Q 30/0635* (2013.01); *H04L 43/0864* (2013.01); *H04L 43/106* (2013.01); *H04L 43/16* (2013.01); *G06N 20/00* (2019.01)

(58) Field of Classification Search
CPC ............ G06Q 10/087; G06Q 30/0609; G06Q 30/0635; G06Q 30/06; G06Q 30/0601; G06Q 40/00; G06Q 40/025; G06Q 20/4016; G06Q 20/40; G06Q 30/0641; G06Q 20/12; G06Q 40/04; G06Q 20/401; G06Q 20/382; G06Q 30/0637; G06Q 30/08; G06Q 20/10; G06Q 20/108; G06Q 20/4014;
(Continued)

(56) References Cited

U.S. PATENT DOCUMENTS 6,163,772 A * 12/2000 Kramer ................ G06Q 20/202
 705/79
6,324,525 B1 * 11/2001 Kramer ................ G06Q 20/00
 705/40
(Continued)

*Primary Examiner* — Greg C Bengzon
(74) *Attorney, Agent, or Firm* — Billion & Armitage

(57) ABSTRACT

Embodiments of the invention are directed to a system and method for providing a high-volume transaction queueing, reserve ecommerce solution that automatically engages and queues transactions when a primary back-end transaction processing system becomes unresponsive or unstable. Through machine learning algorithms, embodiments of the invention control transaction submission rates by queuing them and throttling the rate at which they are processed based on self-awareness and constant monitoring, feedback and health checks of the primary system. When metrics indicate that the third-party system can begin accepting transactions again, the system automatically feeds the queued transactions along with real-time orders at a rate that the third-party system can successfully manage.

21 Claims, 4 Drawing Sheets

(51) Int. Cl.
*H04L 43/106* (2022.01)
*H04L 43/0864* (2022.01)
*G06N 20/00* (2019.01)

(58) Field of Classification Search
CPC ............ G06Q 20/4018; G06Q 20/405; G06Q 30/0222; G06Q 30/0613; G06Q 30/0633; G06Q 40/08; G06Q 20/3821; G06Q 30/0185; G06Q 30/02; G06Q 30/0207; G06Q 30/0251; G06Q 30/0253; G06Q 30/0261; G06Q 30/0269; G06Q 30/0603; G06Q 30/0215; G06Q 30/00; G06Q 40/02; G06Q 40/12; G06Q 50/01; G06Q 10/083; G06Q 10/1093; G06Q 10/1095; G06Q 20/027; G06Q 20/0855; G06Q 20/3276; G06Q 20/403; G06Q 20/407; G06Q 30/016; G06Q 30/0239; G06Q 30/0611; G06Q 30/0617; G06Q 30/0621; G06Q 50/28; G06Q 99/00; G06Q 20/04; G06Q 20/102; G06Q 20/20; G06Q 20/202; G06Q 20/209; G06Q 20/24; G06Q 20/32; G06Q 20/3223; G06Q 20/3224; G06Q 20/3226; G06Q 20/3274; G06Q 20/3674; G06Q 20/3825; G06Q 20/387; G06Q 30/0212; G06Q 30/0225; G06Q 30/0282; G06Q 30/04; G06Q 30/0605; G06Q 40/128; G06Q 50/265; G06Q 10/00; G06Q 10/02; G06Q 10/0639; G06Q 10/06395; G06Q 10/08; G06Q 20/203; G06Q 20/208; G06Q 20/22; G06Q 20/3227; G06Q 20/352; G06Q 20/36; G06Q 20/3827; G06Q 20/389; G06Q 30/018; G06Q 30/0255; G06Q 30/0277; G06Q 50/188; H04L 43/08; H04L 43/0876; H04L 67/02; H04L 67/1002; H04L 43/0864; H04L 43/106; H04L 43/16; H04L 63/1425; H04L 63/0815; H04L 63/102; H04L 63/107; H04L 63/168; H04L 63/1466; H04L 63/1483; H04L 63/1416; H04L 63/145; H04L 67/22; H04L 69/329; H04L 12/1813; H04L 2463/102; H04L 63/18; H04L 67/06; H04L 67/10; H04L 67/306; H04L 2209/56; H04L 43/04; H04L 63/0281; H04L 63/0464; H04L 63/0492; H04L 63/0869; H04L 63/101; H04L 63/123; H04L 63/14; H04L 63/1408; H04L 63/1441; H04L 63/166; H04L 63/20; H04L 67/025; H04L 67/1095; H04L 67/322; H04L 67/34; H04L 67/42; H04L 9/321; H04L 9/3249; H04L 9/3271; G06N 20/00; G06N 5/022; G06N 5/003; G06N 5/02; G06N 5/047; G06N 7/005; G06F 21/44; G06F 21/128; G06F 21/54; G06F 21/552; G06F 16/955; G06F 16/958; G06F 16/24578; G06F 21/31; G06F 21/316; G06F 21/445; G06F 21/6245; G06F 21/64; G06F 2221/2103; G06F 2221/2115; G06F 2221/2133; G06F 2221/2137; H04M 15/58; H04W 12/02; H04W 12/06; H04W 12/12; H04W 4/21; H04W 84/18

See application file for complete search history.

(56) References Cited

U.S. PATENT DOCUMENTS

| | | | | |
|---|---|---|---|---|
| 6,983,320 B1* | 1/2006 | Thomas | ........... | G06Q 10/10 707/999.005 |
| 7,013,323 B1* | 3/2006 | Thomas | ........... | G06Q 30/02 707/999.004 |
| 7,110,967 B1* | 9/2006 | Espenes | ........... | G06Q 30/02 705/26.2 |
| 7,249,059 B2* | 7/2007 | Dean | ........... | G06Q 10/087 705/14.73 |
| 7,979,297 B1* | 7/2011 | Shivananda | ........... | G06Q 10/087 705/7.27 |
| 8,078,483 B1* | 12/2011 | Hirose | ........... | G06Q 10/02 705/1.1 |
| 8,108,299 B1* | 1/2012 | Waelbroeck | ........... | G06Q 40/04 705/37 |
| 8,255,288 B1* | 8/2012 | Gupta | ........... | G06Q 30/06 705/26.41 |
| 8,281,309 B2* | 10/2012 | Meda | ........... | G06F 11/3466 718/101 |
| 8,306,870 B2* | 11/2012 | Mesaros | ........... | G06Q 30/0264 705/26.41 |
| 8,311,863 B1* | 11/2012 | Kemp | ........... | G06Q 10/0639 705/7.11 |
| 8,370,395 B1* | 2/2013 | Gupta | ........... | G06F 3/067 707/799 |
| 8,429,049 B2* | 4/2013 | Smith | ........... | H04L 47/70 705/35 |
| 8,533,105 B1* | 9/2013 | Silverman | ........... | G06Q 40/00 705/37 |
| 8,538,843 B2* | 9/2013 | Smith | ........... | H04L 47/70 705/35 |
| 8,561,184 B1* | 10/2013 | Marsa | ........... | H04L 67/22 726/22 |
| 8,606,644 B1* | 12/2013 | Bruckhaus | ........... | G06Q 10/02 705/26.1 |
| 8,688,545 B1* | 4/2014 | Angilivelil | ........... | G06Q 30/06 705/26.81 |
| 9,059,938 B1* | 6/2015 | Strand | ........... | H04L 67/42 |
| 9,558,465 B1* | 1/2017 | Arguelles | ........... | G06F 11/3006 |
| 9,747,618 B1* | 8/2017 | Reiss | ........... | G06Q 30/0275 |
| 9,805,402 B1* | 10/2017 | Maurer | ........... | G06Q 10/087 |
| 9,875,500 B2* | 1/2018 | Garnepudi | ........... | G06Q 30/0637 |
| 9,916,560 B2* | 3/2018 | Vasantham | ........... | G06Q 20/203 |
| 10,057,333 B2* | 8/2018 | Pitio | ........... | G06Q 40/04 |
| 10,063,661 B2* | 8/2018 | Jan | ........... | H04L 67/42 |
| 10,223,729 B2* | 3/2019 | Douglas | ........... | G06Q 10/063 |
| 10,373,242 B2* | 8/2019 | Garnepudi | ........... | G06Q 30/0637 |
| 2001/0042023 A1* | 11/2001 | Anderson | ........... | G06Q 30/06 705/26.2 |
| 2002/0013731 A1* | 1/2002 | Bright | ........... | G06Q 30/06 705/22 |
| 2002/0052801 A1* | 5/2002 | Norton | ........... | G06Q 30/0625 705/26.43 |
| 2002/0083175 A1* | 6/2002 | Afek | ........... | H04L 63/1458 709/225 |
| 2002/0099649 A1* | 7/2002 | Lee | ........... | G06Q 20/4016 705/38 |
| 2002/0143655 A1* | 10/2002 | Elston | ........... | H04L 29/06 705/26.81 |
| 2002/0188499 A1* | 12/2002 | Jenkins | ........... | G06Q 10/087 705/28 |
| 2003/0188013 A1* | 10/2003 | Nishikado | ........... | H04L 67/42 709/238 |
| 2004/0010626 A1* | 1/2004 | Gillam | ........... | H04L 67/06 709/250 |
| 2005/0065855 A1* | 3/2005 | Geller | ........... | G06Q 30/0601 705/26.1 |
| 2005/0203804 A1* | 9/2005 | Suzuki | ........... | G06Q 10/06393 705/14.46 |
| 2006/0026682 A1* | 2/2006 | Zakas | ........... | H04L 63/0263 726/22 |
| 2006/0080196 A1* | 4/2006 | Griffin | ........... | G06Q 40/04 705/35 |

(56) References Cited

U.S. PATENT DOCUMENTS

| | | | |
|---|---|---|---|
| 2006/0282346 A1* | 12/2006 | Kernodle | G06Q 10/06375 705/28 |
| 2007/0055554 A1* | 3/2007 | Sussman | G06Q 30/0217 705/5 |
| 2007/0106546 A1* | 5/2007 | Esau | G06Q 10/00 705/26.1 |
| 2007/0124213 A1* | 5/2007 | Esau | G06Q 10/08 705/26.1 |
| 2007/0130313 A1* | 6/2007 | King | H04L 67/2819 709/223 |
| 2007/0239556 A1* | 10/2007 | Wagner | G06Q 30/0641 705/17 |
| 2008/0027735 A1* | 1/2008 | Bruchlos | G06Q 30/016 705/304 |
| 2008/0086435 A1* | 4/2008 | Chesla | H04L 63/1458 706/12 |
| 2008/0243536 A1* | 10/2008 | Dworkin | H04L 67/1002 705/1.1 |
| 2008/0243576 A1* | 10/2008 | Czupek | G06Q 40/00 705/35 |
| 2008/0243634 A1* | 10/2008 | Dworkin | G06Q 30/0601 705/26.1 |
| 2008/0270268 A1* | 10/2008 | Pacha | G06Q 10/04 705/28 |
| 2008/0294996 A1* | 11/2008 | Hunt | G06Q 30/02 715/739 |
| 2008/0319829 A1* | 12/2008 | Hunt | G06Q 30/0201 705/7.29 |
| 2009/0006156 A1* | 1/2009 | Hunt | G06Q 30/02 705/7.11 |
| 2009/0077233 A1* | 3/2009 | Kurebayashi | H04L 47/193 709/224 |
| 2010/0088212 A1* | 4/2010 | Czupek | G06Q 40/06 705/37 |
| 2010/0088214 A1* | 4/2010 | Czupek | G06Q 40/06 705/37 |
| 2010/0088216 A1* | 4/2010 | Czupek | G06Q 10/087 705/37 |
| 2011/0082814 A1* | 4/2011 | Chiulli | G06Q 40/025 705/36 R |
| 2011/0153839 A1* | 6/2011 | Rajan | H04L 69/16 709/227 |
| 2011/0295722 A1* | 12/2011 | Reisman | G06Q 30/0641 705/27.1 |
| 2011/0320395 A1* | 12/2011 | Dada | G06Q 30/02 706/47 |
| 2012/0084165 A1* | 4/2012 | Hirose | H04L 43/08 705/26.1 |
| 2012/0089486 A1* | 4/2012 | Mahakian | G06Q 30/0635 705/26.81 |
| 2012/0143741 A1* | 6/2012 | Lopez de Prado | G06Q 40/00 705/37 |
| 2012/0158566 A1* | 6/2012 | Fok | G06Q 40/00 705/35 |
| 2012/0330954 A1* | 12/2012 | Sivasubramanian | G06F 16/217 707/737 |
| 2013/0013487 A1* | 1/2013 | Sellberg | G06Q 40/06 705/37 |
| 2013/0080351 A1* | 3/2013 | Schneider | G06Q 40/04 705/36 R |
| 2013/0080635 A1* | 3/2013 | Ho | H04L 67/32 709/225 |
| 2013/0262678 A1* | 10/2013 | Tung | H04L 41/5016 709/226 |
| 2014/0025535 A1* | 1/2014 | Douglas | G06Q 30/0633 705/26.8 |
| 2014/0052835 A1* | 2/2014 | Felton | H04L 41/0686 709/223 |
| 2014/0067780 A1* | 3/2014 | Lipscomb | G06Q 30/0601 707/695 |
| 2014/0081802 A1* | 3/2014 | Oiwa | G06Q 50/34 705/26.8 |
| 2014/0095285 A1* | 4/2014 | Wadell | G06Q 30/00 705/14.25 |
| 2014/0122453 A1* | 5/2014 | Gocek | G06F 16/2365 707/704 |
| 2014/0149273 A1* | 5/2014 | Angell | G06Q 40/04 705/37 |
| 2014/0188668 A1* | 7/2014 | Brabec | G06Q 30/0635 705/26.81 |
| 2014/0330426 A1* | 11/2014 | Brunner | G06Q 10/08 700/216 |
| 2014/0330700 A1* | 11/2014 | Studnitzer | G06Q 40/04 705/37 |
| 2015/0073967 A1* | 3/2015 | Katsuyama | G06Q 40/04 705/37 |
| 2015/0073970 A1* | 3/2015 | Merold | G06Q 40/04 705/37 |
| 2015/0081485 A1* | 3/2015 | Angelovski | G06Q 40/12 705/30 |
| 2015/0088697 A1* | 3/2015 | Garnepudi | G06Q 30/0637 705/26.82 |
| 2015/0100465 A1* | 4/2015 | Dornbush | G06Q 10/087 705/28 |
| 2015/0287108 A1* | 10/2015 | Monk | G07F 9/00 705/5 |
| 2015/0324882 A1* | 11/2015 | Ouimet | G06Q 30/0639 705/26.41 |
| 2015/0332398 A1* | 11/2015 | Brkic | G06Q 40/04 705/37 |
| 2015/0339162 A1* | 11/2015 | Kose | G06F 9/505 718/105 |
| 2015/0348169 A1* | 12/2015 | Harris | G06Q 30/0633 705/26.8 |
| 2016/0055490 A1* | 2/2016 | Keren | G06Q 30/00 705/14.47 |
| 2016/0055503 A1* | 2/2016 | Chan | G06Q 30/0261 705/7.34 |
| 2016/0078370 A1* | 3/2016 | McEwen | G06Q 10/02 705/5 |
| 2016/0078536 A1* | 3/2016 | Rooney | G06Q 40/04 705/37 |
| 2016/0078538 A1* | 3/2016 | Katsuyama | G06Q 40/04 705/37 |
| 2016/0140519 A1* | 5/2016 | Trepca | G06F 16/245 705/26.44 |
| 2016/0182328 A1* | 6/2016 | Bhasin | H04L 43/067 709/224 |
| 2016/0182330 A1* | 6/2016 | Iannaccone | H04L 67/1095 709/224 |
| 2016/0182331 A1* | 6/2016 | Iannaccone | H04L 43/10 709/224 |
| 2016/0196606 A1* | 7/2016 | Damodaran | G06Q 40/06 705/37 |
| 2016/0205174 A1* | 7/2016 | Pitio | G06Q 40/04 709/201 |
| 2016/0205180 A1* | 7/2016 | Jan | H04L 67/42 709/203 |
| 2016/0226955 A1* | 8/2016 | Moorthi | G06F 9/5066 |
| 2018/0075519 A1* | 3/2018 | Garnepudi | G06Q 30/0637 |
| 2018/0375964 A1* | 12/2018 | Jan | G06F 9/546 |

\* cited by examiner

HIGH VOLUME TRANSACTION QUEUEING WITH MACHINE LEARNING

RELATED APPLICATIONS

This application claims the benefit of U.S. Provisional Application No. 62/335,740 filed 13 May 2016, entitled "High Volume Transaction Queueing with Machine Learning," which is incorporated herein by reference.

FIELD OF THE INVENTION

The present disclosure relates generally to the handling of high volumes of traffic over the internet. More particularly, this disclosure relates to monitoring and measuring the response of a primary ecommerce platform by an external ecommerce system using machine learning to redirect transaction requests to the external system when the primary platform has stability or performance issues.

BACKGROUND

Occasionally, novel products are introduced into the marketplace with their demand far exceeding their supply. Take, for example, Apple's iPad and iPad2. These items were launched to crowds of consumers waiting outside stores for hours to purchase a limited supply of products. While the seller (i.e. manufacturer, retailer, etc.) may be overjoyed at the demand, such a situation does not create a good customer experience. Purchasers may stand in line for hours only to be told when they reach the counter that there are no products left for them. Anger flares when some consumers purchase multiple quantities for resale on internet auction sites or in foreign countries where the items are not available via legitimate markets, and leave those waiting in line behind them with nothing.

An ecommerce solution solves some of these problems. Rather than wait in line for hours with uncertain results, consumers may access an online store to purchase the item. The purchaser could even preorder the item in order to receive it when it hits the market. However, business, technical and functional challenges still exist, especially if the ecommerce system infrastructure and surrounding technology are not prepared to handle unusually high demand.

Periods during which online applications receive an exceptionally high volume of transactions, such as holidays or during preorder or release of long-awaited products, present a number of technical and user-experience related issues. As those of ordinary skill in the computer arts are aware, there are some general issues around traffic that all online applications face with being on the internet. Designing an online system involves designing for performance. Performance is impacted by the interest and interaction with the application online. Whereas a desktop application may involve just one user operating the software at a particular time, users of an online application may number several to millions of people at the same time.

Online applications are architected and sized for performance under normal or typical conditions and do not work well when traffic spikes. For example, the owner of a population of servers with information that is provided frequently to the internet will want that information to be cached in memory so that repeated access to that information is quick and inexpensive. Under load, that cache can benefit performance. However, if the system does not have enough traffic hitting the cache servers, enough to keep the cache "warm" (where cached items are frequently requested), then users who trickle into the site will have poor performance. So, when developers design and build an internet application, they build in an amount of cache and population of web servers that size to the amount of traffic that will normally be expected. That system is then tuned to expect that in most circumstances the users are getting the benefit of the cache. If a spike event occurs, a period of high volume, high demand on the system, the system breaks down.

It is unrealistic, in time and cost, to grow the size of the infrastructure to meet spike, or high demand, loads as they occur, and system issues develop if the system is scaled to operate at the increased level of traffic. Referring again to the caching example above, once the traffic subsides the typical amount of traffic received will not induce the algorithms behind the scenes to keep the cache populated effectively. The infrastructure required for a spike event is poisonous to normal traffic and the infrastructure needed for normal traffic is insufficient to meet the needs of the spike.

For online commerce, poor performance of a web store is associated with a very low close rate. Although customers users are not physically standing in line, they are in a very real, electronic queue. An electronic queue may be even more congested than a physical queue because of the centralized nature of ecommerce purchasing and the system issues discussed above, resulting in connectivity or communication problems if the system is not sufficiently robust. A high volume of requests headed for the same web server must pass through the network, the network interface to the server and the server's operating system prior to getting to the web server itself. An overload of requests may cause issues at any one of these points, frustrating the user's efforts to get to the destination web server. An overload of requests hitting the web server will result in an unwanted error page presented to a user, who may give up trying to access the site in frustration, or just forget to come back later. If limits are placed on the quantity that may be purchased, the system must ensure that the purchaser not lose his place in queue or he risk losing the item and the merchant risks losing the sale. If the merchant loses the sale, the commerce system provider may lose the client merchant, especially if Service Level Agreements criteria are not met.

High volume, high demand and limited supply orders aside, an online store may experience instability or performance issues for any number of technical reasons, and it may happen at the worst of times, such as during holiday shopping periods. Performance issues and inventory issues leave customers so frustrated they may abandon their online cart and go elsewhere for the product. Instability and downtime are expensive, result in loss of sales and increased maintenance costs. An effective solution to this problem allows the commerce provider to utilize a system optimized for normal traffic during those periods, but change over to a system designed for spikes in traffic when periods of instability in the normal system are detected. The system and methods described herein provide that solution and offer other advantages over the prior art.

SUMMARY

HVTQ is a reserve ecommerce solution that automatically engages and queues orders when a primary back-end transaction processing system becomes unresponsive or unstable. Through algorithms such as those described herein, embodiments of the invention apply machine learning techniques to control transaction submission rates by queuing orders and throttling the rate at which they are processed based on self-awareness and constant monitoring, feedback and health checks of the primary system. When metrics indicate that the third-party system can begin accepting orders again, HVTQ automatically feeds the queued orders along with real-time orders at a rate that the third-party system can successfully manage.

Many ecommerce platforms have the ability to queue transactions. These queuing solutions notify shoppers after holding the order for a day or two that the order has failed or is successfully placed. The shopper does not know, at the time the order is placed, whether the order will be successful or not. HVTQ was designed to maintain a high-quality user experience. Upon placing an order when HVTQ is running, the user receives an order confirmation and an email stating that their order was received and is being processed. Further, once the order is originally placed, inventory is allocated against that order even though it is in a queued state to ensure successful completion of the order.

The HVTQ system and method described herein is self-aware. Using algorithms, it constantly monitors the health of the third-party back end system. When system performance degrades to a certain threshold, HVTQ automatically engages (no human intervention is required) and queues orders. Because HVTQ constantly monitors the health of the third-party system, it knows when and at what rate it can begin feeding queued orders back to the third-party system. HVTQ also has an "intermediate" state where it feeds both queued and real-time orders simultaneously to the third-party system. Again, because it is constantly checking the third-party system's health, it knows the velocity at which it can successfully send orders for processing. This HVTQ solution is innovative because it is system agnostic. It can be integrated into any third-party processing system, giving it ultimate flexibility.

The HVTQ solution ensures that ecommerce orders are not lost due to degraded system performance or instability. If a transaction processing system is not performant, orders are not successfully placed, and sales are not captured. HVTQ functions almost like an insurance policy—it's there to take over as soon as a third-party transaction processing system goes down, and ensures that sales are captured and the shopper has the same high quality experience they have when all systems are performing normally.

Ecommerce platforms have a need for a system and method that can measure the performance of the system and step in to capture transactions when the ecommerce system experiences instability or poor performance. The solution described herein provides that system and method and offers other improvements over the prior art.

BRIEF DESCRIPTION OF THE DRAWINGS

Having described embodiments of the invention in general terms, reference will now be made to the accompanying drawings, wherein.

DETAILED DESCRIPTION

Embodiments of the present invention may be described more fully hereinafter with reference to the accompanying drawings, in which some, but not all, embodiments of the invention are shown. The invention may be embodied in many different forms and should not be construed as limited to the embodiments set forth herein; rather, these embodiments are provided so that the disclosure may enable one of ordinary skill in the art to make and use the invention. Like numbers refer to like components or elements throughout the specification and drawings.

Embodiments of a high-volume transaction queueing with machine learning system and method (also referred to herein as "external system") provide an external backup to a primary ecommerce system, (also referred to as a "third-party system," "primary system" or "primary platform"), when the primary system experiences system overload or performance and stability issues, preventing loss of revenue and providing a satisfying customer experience. This situation frequently arises when a new item is offered for sale, or an item is of particularly high demand, or during expected periods of high internet traffic to a merchant site, such as is experienced during the holidays.

Embodiments of the invention are designed to monitor the health of the primary (merchant) system by transaction type (e.g. submit shopping cart, a request to calculate tax, or some other type of request). For the purpose of this document, the terms "transaction," "request," "call," "message," and "order" are synonymous and may be used interchangeably. Other embodiments may protect other calls processed by the primary system using the same system and methods and although they are not described in detail here, the solution is the same as is applied to the order call.

In some environments operating embodiments of the system, some type of transaction processing takes place on the external system before it is forwarded to the primary system. In other words, the primary system may be integrated with the external system to capture a transaction, perform fraud checks, allocate inventory, etc., before passing an enhanced request on to the primary platform. The external system collects data regarding its attempts to feed transactions to the primary system and, when it determines that the primary system is in distress, it begins queueing transactions. Transactions are queued until the system determines that the primary system is ready to receive new transactions and slowly begins to forward them to the primary system. The queued transactions may be fed to the primary system gradually to avoid overloading it again.

Figure 1:
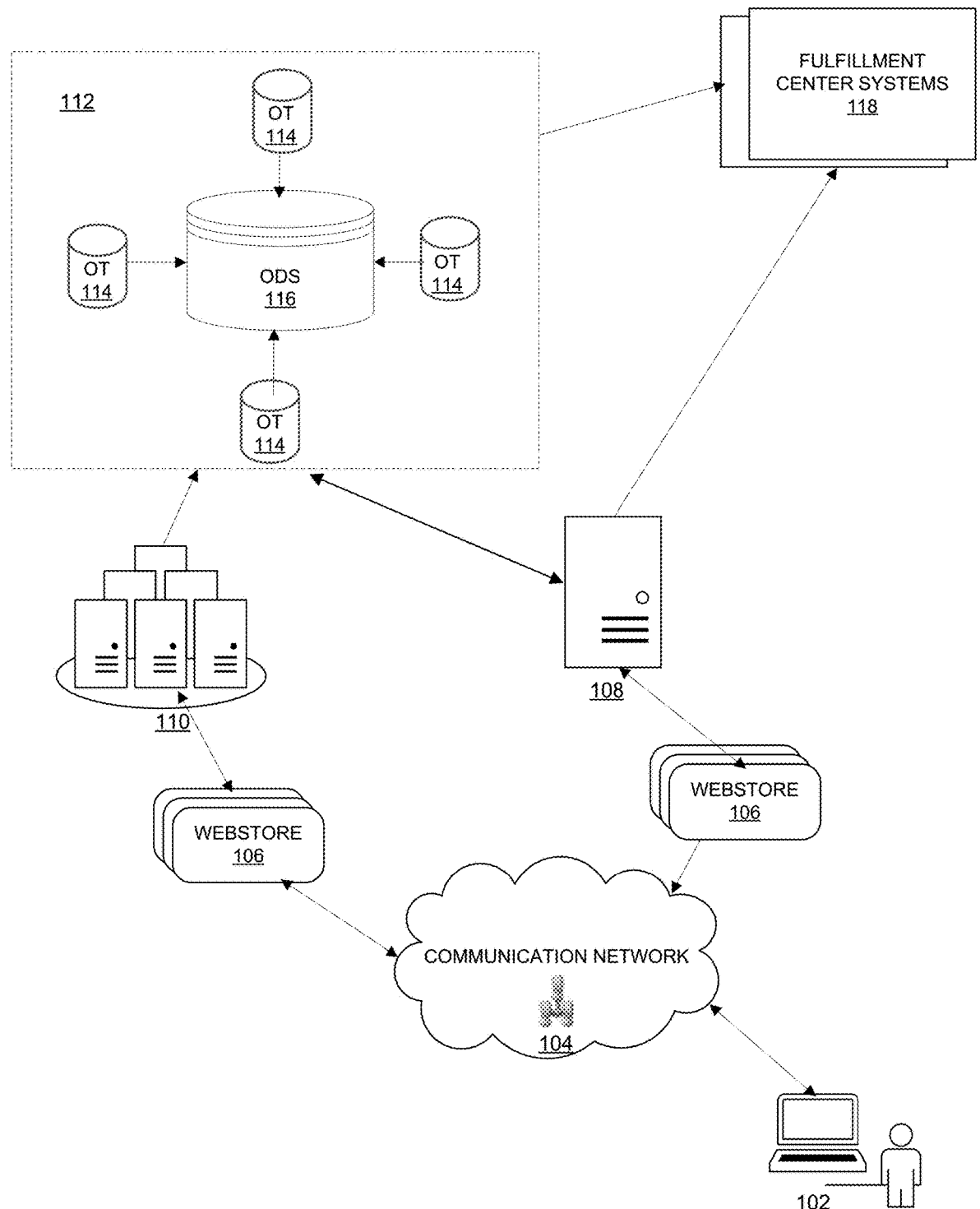
FIG. 1 illustrates an exemplary environment in which embodiments described herein may be practiced.

FIG. 1 illustrates an exemplary environment in which embodiments of this invention operate. In this environment, a transaction originator or user 102 on a computing device might engage with a webstore 106 through a communication network, such as the internet 104. Behind the webstore there may be a number of services, providers and machinery used to facilitate the web site and the transaction process. For example, the webstore owned by a merchant 108 may be hosted by the merchant (primary platform) or by a full-service, global ecommerce provider 110, a combination of the two, or in some other configuration. A global ecommerce provider 110 might have multiple data centers located strategically throughout the world; each data center comprising multiple servers, each server comprising at least one processor, a non-transitory memory device for data storage and modules and applications, and communications device. Some data centers may use a co-located pod configuration 112, whereby numerous order taker application servers 114, each with no administrative capability, but with its own order taker database, exist to capture transactions. The transactions are then transferred to an operational data store (ODS) 116 for full order processing. Within each order taker 114, transaction processing application modules are stored, and called to perform specific functions on the data submitted with a transaction. Each pod is given a name so transactions may be directed to a specific pod, if desired.

There are many benefits to this type of system. The order takers 114 can continue to accept transactions while maintenance is done on the ODS 116. Communications between the order taker and the ODS 116 may be two-way—maintenance data changes (look-up data, e.g. site, product, catalog) may be pushed from the ODS 116 to the order taker using a data replication tool. The concept of shared data exists in this type of system as well, by including a shared database. Shared data is data for which there can be only one copy that must be visible to all applications instances at all times. Examples of shared data include originator/user data and Digital Rights. This type of configuration provides parallel, redundant, executing applications. The ODS 116 may provide all of the backend services required for transaction processing, or some may be provided by the ODS 116 and some by the primary platform 108. Each may complete transaction processing and then forward a request for fulfillment to fulfillment center systems 118, such as a physical goods warehouse or a digital downloads center.

In at least one exemplary integration, a web merchant 108 may prefer to perform much of the transaction processing itself, while contracting with a global ecommerce services provider 110 for any number of front-end or back-end services. Front-end services might be related to fraud screening, inventory allotment, for example, and back-end services might be related to tax calculations, payment processing, and other services. The global ecommerce services provider 110 performs the contracted services and forwards a message containing the user request, enhanced with data related to the services it has processed, to the primary system 108.

Web sites and services, being machines with limited resources, may experience instability when a high volume of transactions is submitted during a very short period of time, as can happen with high demand products sold during the holidays. During periods of peak traffic on a node (e.g. web server, application server, etc), the ecommerce service provider 110 must be able to continue to accept orders and provide the transaction originator with an acceptable experience while preventing further instability of the primary selling platform 108. When this occurs, the ecommerce system 110 must hold incoming orders until the primary system 108 has regained stability, and then continue to monitor system health.

In some embodiments, a shopper node (order taker server 114 as described above) processes the transaction and submits it to the primary platform 108 while monitoring the health of the primary system 108 to determine a course of action for an incoming transaction. A service monitoring module residing on the shopper node 114 or util node (an ODS server 116 capturing and reprocessing queued transactions) may comprise computer code, which when executed by the processor collects data on each call made to the primary system, calculates metrics and sets or resets a circuit breaker that directs transactions to queue in times of primary system 108 distress. Processes resident on the util node, discussed below, resubmits queued transactions for processing. As transactions are presented to the primary platform 108, data is collected regarding the health of the primary system 108 and is used to control the flow of transactions to the primary platform 108. Similarly, when an attempt is made to resubmit queued orders, a service monitoring module on the util node 116 collects data and calculates metrics that set the circuit breaker on that node.

Nodes (processing locations) comprise computing devices, such as the user computing device, and the servers hosting the ecommerce systems (global ecommerce and primary platform) and HVTQ modules used to implement embodiments of the invention, may include a communication device, a processing device and a memory device. The processing device is operatively coupled to the communication device and the memory device. As used herein, "processing device" generally includes circuitry used for implementing the communication and/or logic functions of the particular system. For example, a processing device may include a digital signal processor device, a microprocessor device, and various analog-to-digital converters, digital to analog converters and other support circuits alone or in combination. Control and signal processing functions of the system are allocated between these processing devices according to their respective capabilities. The processing device may include functionality to operate one or more software programs based on computer readable instructions which may be stored in a non-transitory memory device, typically as modules encapsulating code to implement a particular functionality. The processing device uses the communication device to communicate with the network and the devices and systems on the network, such as, but not limited to the user computing device, the global ecommerce (external) system, and the primary platform. As such, the communication device generally comprises a modem, server or other device for communicating with other devices on the network.

Figure 2:
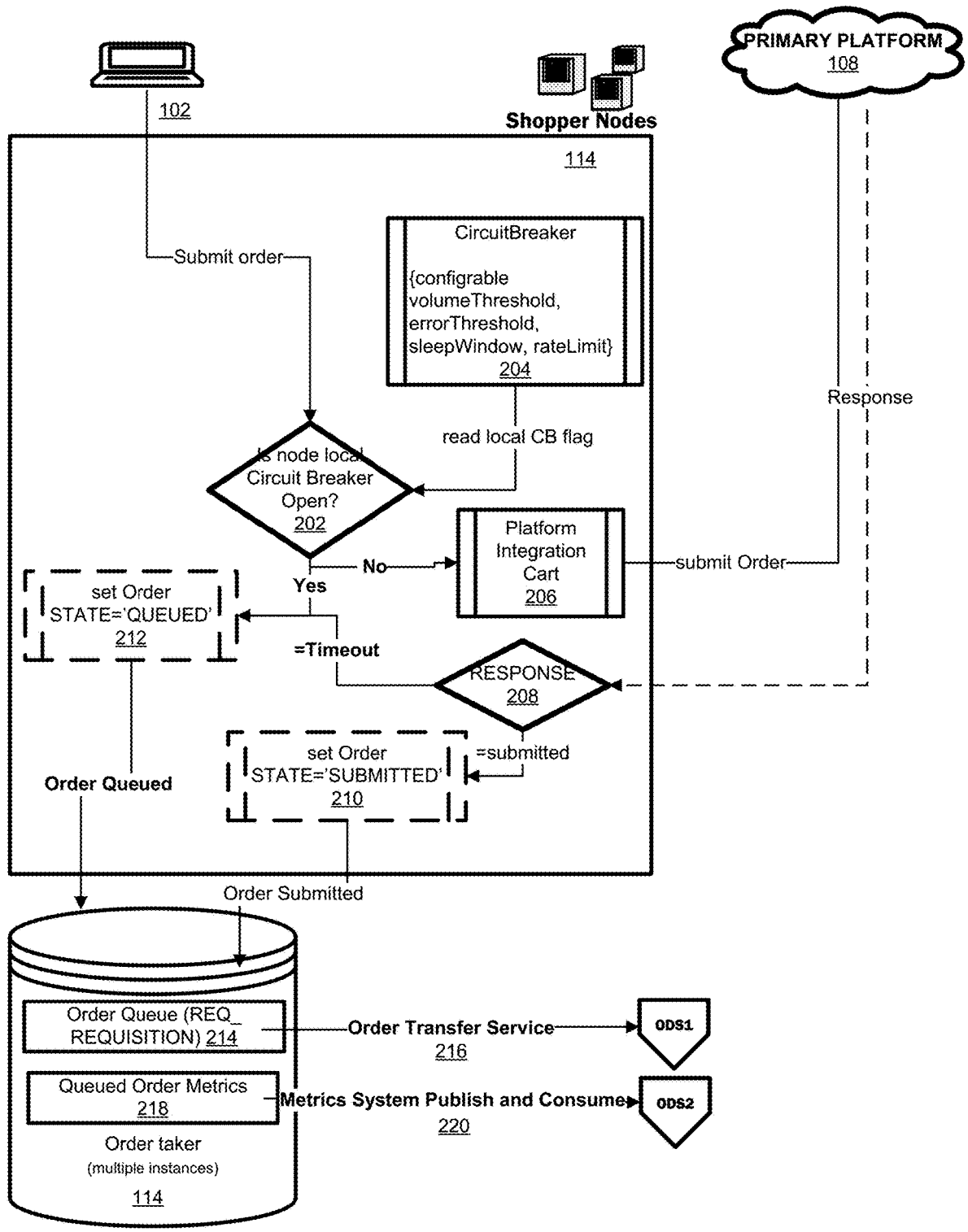
FIG. 2 illustrates the architecture and data flow of a request made to a shopper node in accordance with an embodiment of the invention.
Figure 3:
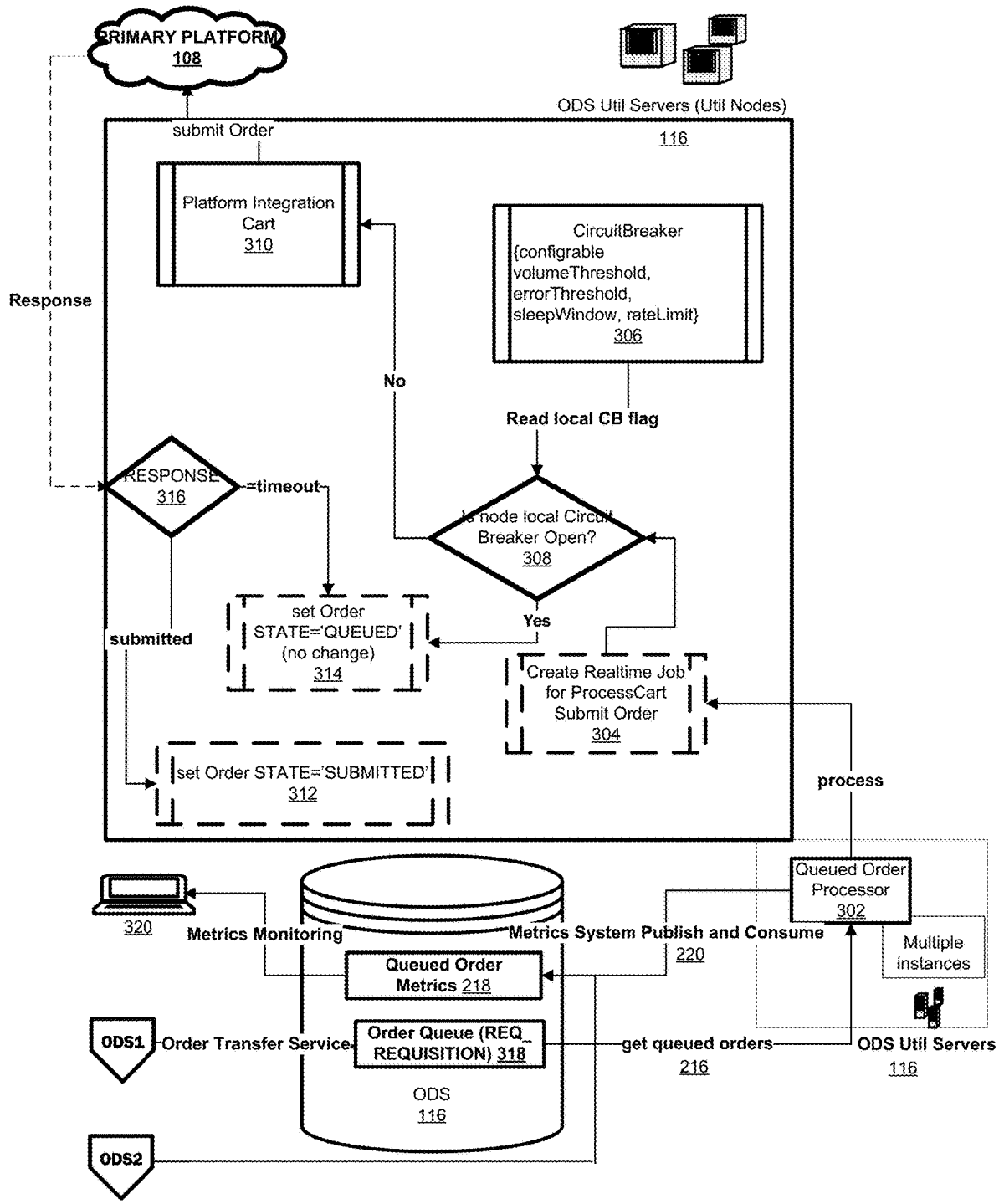
FIG. 3 illustrates the architecture and data flow of a request made to a util node in accordance with an embodiment of the invention.

FIGS. 2 and 3 illustrate the architecture of a high-volume transaction queueing system. FIG. 2 illustrates a shopper node (order taker) 114. Processes reside on the shopper node to (1) receive and pre-process transactions; (2) send the transactions, enhanced with data derived from pre-processing to the primary platform 206; (3) collect data regarding performance of the transaction submission 216 to the primary platform; (4) calculate indicia of performance used to determine whether incoming orders should be processed normally or queued (and setting the circuit breaker to closed or open 204, depending on that determination; (5) set order status as either "submitted" or "queued" and store those transactions in an order taker data store 114; (6) transfer orders 214 to the ODS 116; and (7) transfer metrics 218 to a metrics system 318.

Referring again to FIG. 2, the user 102 may submit an order to the shopper node 110, 114. The shopper node receives the transaction and performs its front-end processing tasks, such as inventory checking and fraud analysis, then checks 202 the circuit breaker 204 to determine whether the primary system 108 can receive transactions. If the circuit breaker 204 is closed, the order is submitted 206 to the primary platform 108 for processing. The service monitoring module 218 collects data (described in more detail below) regarding this message flow, for example, a timestamp for when the message was sent and when a response 208 was received. The data is used to determine the configurable settings on the circuit breaker 204, including volumeThreshold, errorThreshold, sleepWindow and rateLimit. If the transaction receives a response indicating that the transaction has been submitted without error or delay, the order state is set to 'submitted' 210.

When the service monitoring module 218 determines that the primary system 108 is unstable or in distress, the circuit breaker 202, 204 is closed. As long as the circuit breaker 202, 204 is closed, transactions are pre-processed normally, but instead of being submitted to the primary platform, their status is set to 'queued' 212 and the transaction requests are held in queue. All transactions are then stored in the shopper node database 114 as 'submitted' or 'queued' and will be transferred to the ODS (FIG. 4) via an order transfer service 216 on a routine basis. Queued order metrics from the service monitoring module 218 are also stored in the shopper node and are transferred to a global metrics 220 system on a routine basis.

FIG. 3 illustrates a util node 116 on an ODS. Util nodes provide utility type services to the ODS in a pod, including submitting queued transactions to the primary platform. Processes reside on the util node 116 to (1) receive transactions from the pod order takers 114; (2) receive metrics from the order takers 114 which were collected as the order taker interacted with the primary platform, and which regard the health of the primary platform; (3) identify, select, collect and prepare 302 queued transaction records 214 from the ODS 116; (4) create a real time job for submitting queued transactions 304; (5) collect data regarding performance of the queued order re-submission 316 to the primary platform; (6) calculate indicia of performance used to determine whether the queued transactions should be resubmitted or continue to be held in queue; (7) reset transaction status as either "submitted 312" or leave as "queued 314" and store those transactions in an ODS data store 116; and (8) update metrics 218 in a metrics monitoring system 330.

Referring again to FIG. 3, once transferred 216 to the ODS util node 116, the queued orders are pulled from the ODS 116 by a queued order processor 302. A real-time job 304 is created for resubmitting the orders to the primary platform 108. A service monitoring module 218, which has collected data from previous attempts to resubmit queued orders and continues to collect data as queued transaction resubmission is attempted or completed, sets the circuit breaker 306 to open or closed. If the circuit breaker 306 is closed, the orders are submitted to the primary platform 108 for processing 206 and data is collected regarding the response 316 received from the primary platform 108. If the orders are successfully submitted to the primary platform 108, their status is set to 'submitted' 312. If the circuit breaker 306 is open, the orders will continue to be deferred to the queued state 314 until the primary system shows signs of recovery. If a response 316 from resubmission continues to indicate performance issues, there is no change in the status of the queued order 314. Once the system shows signs of recovery, the queued orders are resubmitted 304 at a rate limited pace determined by the metrics system to avoid causing further instability with the primary platform 108. During this time, new transactions 206 may be submitted along with queued transactions 304 at a rate that monitoring has indicated the system can process normally without causing further performance issues.

Machine Learning and Circuit Breaker Transitions

As described above, the service monitoring module aggregates data related to the health of the primary platform in order to determine the value of parameters used in setting the circuit breaker, which determines whether the transactions are processed normally or are queued to be retried when the primary platform is healthy again. Each shopper node may have one of three states; each util node one of two, as are listed in Table 1.

TABLE 1

Available States for Each Node

| Node | Description |
| --- | --- |
| Util normal | util nodes retrying queued orders process normally |
| Util deferred | util nodes not processing queued orders (not retrying). |
| Shopper Normal | shopper nodes accepting incoming orders process normally. |
| Shopper Limited | shopper nodes process orders using rate limiting. Concurrent requests will be queued. |
| Shopper Queueing | Shopper nodes queue all traffic. |

Under normal circumstances, both the util node and the shopper node circuit breakers will be closed. Under high load, if the circuit breakers trip, the size of the queue will grow rapidly. If the queue size reaches a configurable limit (Q1), all circuit breakers on all nodes will be opened. After a configurable cool down period (S) the circuit breakers on the util nodes will be set to a rate-limited state. After this point the health of the system will be evaluated by querying the number of orders that were retried successfully versus the number of orders that were retried and requeued since the nodes were all set to open. If a percentage of these requests greater than a configurable threshold (P) are successful, the util node circuit breakers will be set to closed. If the percentage of successful requests is below the threshold, it indicates that the system is not yet healthy, and the util nodes circuit breakers will be set to open again. Once the util node circuit breakers are in a closed state, they will remain in this state until the size of the queue drops below a configurable size (Q2) at which point the shopper nodes will be set to a rate limited state. If instead the size of the queue increases to above the limit Q1, indicating that the system is once again unhealthy, the util node circuit breaker will be set to open again. When the shopper nodes are in the rate limited state and the queue size drops to below a low configurable size (Q3), the shopper node circuit breaker will return to a closed state. Table 2 describes these configurable and calculated parameters. The specified configurable values are set in a config properties file.

TABLE 2

Node Parameters

| Parameter | Name | Definition |
| --- | --- | --- |
| S | Sleep window | The time that must have elapsed after starting queueing all orders to start retrying queued orders. |
| P | Successful Percentage Threshold | The minimum percentage of successful retry attempts allowed. |

TABLE 2-continued

Node Parameters

| Parameter | Name | Definition |
|---|---|---|
| Q1 | Start Queueing Percentage Threshold | The minimum percentage of successful orders before all orders will be queued. |
| Q2 | Half Queueing Threshold | The size the queue must go below to allow shopper nodes to process orders using rate limiting |
| Q3 | Stop Queueing Threshold | The size the queue must go below to allow shopper nodes to process orders |
| W1 | Start Queueing Rolling Window | The look back period for failed orders when evaluating whether to queue. |
| W2 | Date Range for Requisition Retry Job in Hours | The look back period for failed orders when evaluating whether to stop queueing. |
| W3 | Time Interval for Recently Processing Reqs In Minutes | The look back period for queued orders so queued orders are not retried immediately. |

Data, primarily time values, counts and response results (failures or successful attempts and data about them), is collected and metrics calculated at both a global level and a local level, which allows the system to remove a node from service if it appears to be unstable. Configurable settings may be first estimated using historical knowledge of the number of transactions expected, and then recalculated or re-estimated as production data is received. Table 3 provides exemplary global settings, and Table 4 provides exemplary local settings, both with exemplary values. The values listed in Tables 3 and 4 merely provide examples of the configurable values that may be used. Those of ordinary skill in the art will understand that these values should be set to optimize the system practicing the embodiment.

TABLE 3

Exemplary Global Queueing Threshold Settings

| Property | Value | Description |
|---|---|---|
| Q1 | 88% | The minimum number of queued orders (timeouts) to trigger a transition to the U_OPEN_S_OPEN state. |
| S | 30000 ms (5 min) | The time that must have elapsed to reattempt sending orders to the client after the last state transition into U_OPEN_S_OPEN (Queuing orders everywhere). |
| Q2 | 240 | The maximum number of orders in the queue to allow a transition to the U_CLOSED_S_HALF queuing strategy state from the U_CLOSED_S_OPEN state. In half queuing state there may be a small number of queued orders left to process (240, for example) but normal processing of transactions should begin slowly while continuing to queue. Setting to 10% of orders per hour (2,400/hr at peak). |
| P | 95% | Attempt to resubmit to client every 5 minutes after queueing begins. Unless 95% of resubmits are successful in a cycle of resubmits, move breakers back to the U_OPEN, S_OPEN state (transactions may not be processed either in ODS (util) or Shopper). If 95% or more resubmits are successful but the system is still above the halfQueuing threshold (see above), this means that the client endpoint is healthy again but there may be a large queue of transactions to reprocess. If a large queue of transactions is currently being resubmitted to client, the system should not start sending Shopper "Submit Cart" directly to the client to avoid overwhelming it. |
| Q3 | 200 | Queue length is small enough for us to start sending Shopper "Submit Cart" directly to Client. |

TABLE 4

Exemplary Local Node Threshold Settings

| Property | Value | Description |
|---|---|---|
| FR_SHP | 50% | FAILURE RATE Shopper nodes: Percentage of requests that should fail in RW_SHP time to make "Submit Cart" action skip invocation of ProcessCart and queue right way. Unless there is an outage, a typical success rate is 99.8%. A 50% failure rate should be a clear indicator that a node is having trouble submitting orders to the primary platform. |

TABLE 4-continued

Exemplary Local Node Threshold Settings

| Property | Value | Description |
|---|---|---|
| RW_SHP | 30 minutes | ROLLING WINDOW Shopper nodes: Time window to collect error/success percentage. The size of the window is the time it takes to react to an outage. A smaller window will elicit a quicker reaction to an outage but may allow enough requests to provide a meaningful success/failure percentage. |
| VT_SHP | 4 | VOLUME THRESHOLD Shopper nodes: Minimum number of request that should happen in rolling window to decide to make the circuit trip and queue orders straight away. Setting this to 4 means that if there are 3 requests in the 30 minute Rolling Window and all fail, the circuit will still not trip. |
| SW_SHP | 30 minutes | SLEEP WINDOW Shopper Nodes: In past outages things typically go bad for 3-4 hours at least. Half an hour sleep window seems reasonable. |
| FR_BGW | 10% | FAILURE RATE Background (util) nodes: At a volume threshold of 20 this means that in a 5-minute interval at least 18 order reprocesses out of 20 should pass. |
| RW_BGW | 5 minutes | ROLLING WINDOW Background (util) nodes: on a single BGW node there may be between 20 and 25 orders in 5 minutes; 20 when queuing 100% of 2,400 order/hours across 10 BGW nodes. 2.5 when at 12% failure rate. |
| VT_BGW | 20 | VOLUME THRESHOLD Background (util) nodes: Keep volume threshold at 100% queuing (full outage). Anything less than a full outage, try to send across all orders possible. |
| SW_BGW | 5 minutes | SLEEP WINDOW Background (util) nodes: |

Figure 4:
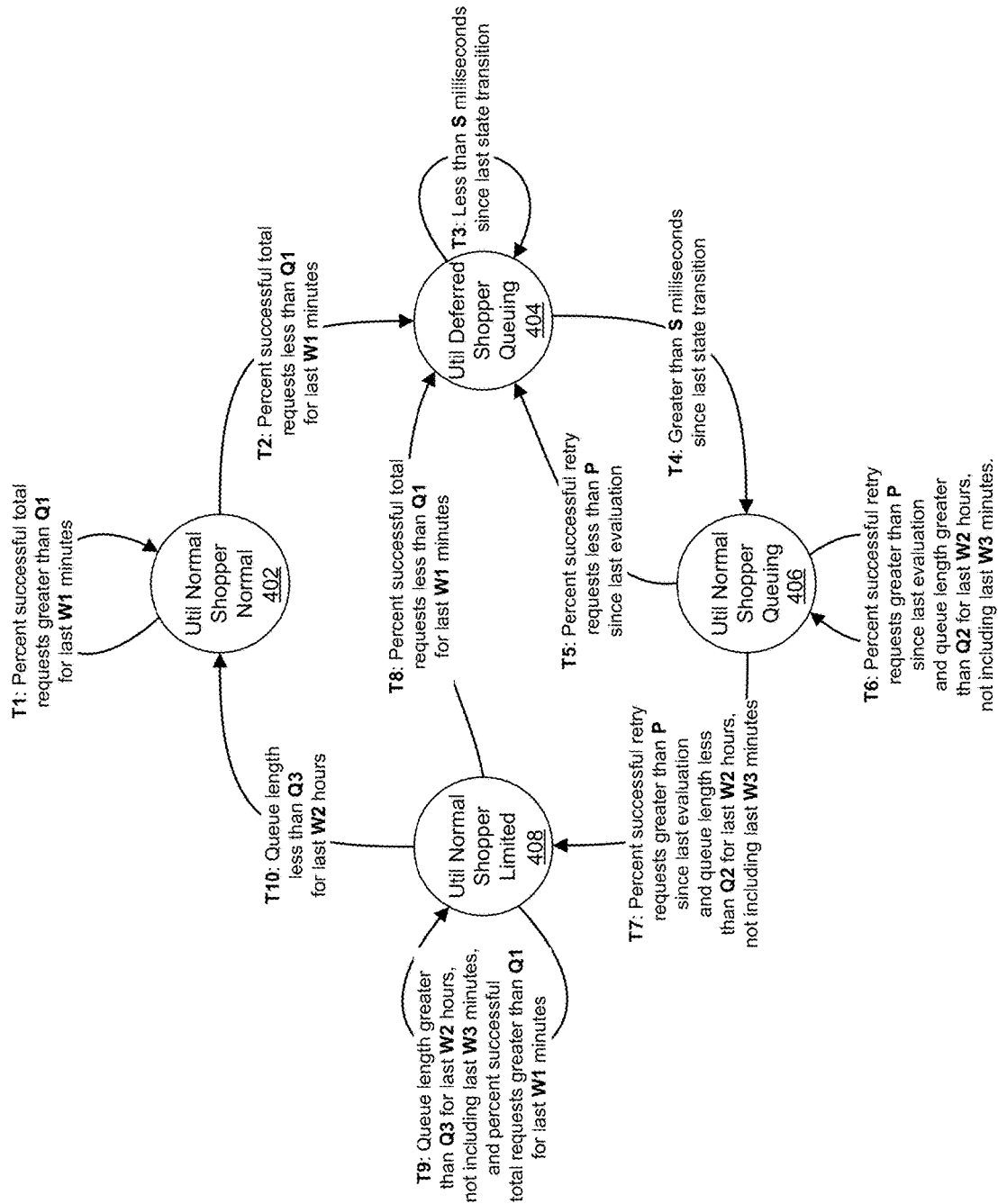
FIG. 4 provides a state diagram illustrating an exemplary state transition flow for determining when an embodiment of an HVTQ will queue transactions or process them normally.

FIG. 4 illustrates the logic used to set node states and initiate transitions. These are exemplary states and transitions. One of ordinary skill in the art would recognize that the states and properties may be designed and configured to fit any the properties and values required by a particular system. In this example, nodes may be in several state combinations: util normal, shopper normal 402; util deferred, shopper queueing 404; util normal, shopper queueing 406; and util normal shopper limited 408. Referring to the property codes above, at 408, the percent of successful total requests is equal to or greater than Q1 for the previous W1 minutes, and the nodes are both in the normal state 402 with circuit breakers opens. When the percent of successful total requests degrades to less than Q1 for the previous W1 minutes, and it has been less than S milliseconds since the last state transition, the shopper node circuit breakers are open and transactions begin queueing; util (resubmitting queued orders) is deferred 404. At 406, it has been more than S milliseconds since the last state transition, the percent successful retry requests is greater than P since the last evaluation and queue length is greater than Q2 for the last W2 hours, not including the last W3 minutes. Here, util is normal and the shopper node is queueing. At 408, the queue length has been greater than Q3 for the previous W2 hours, not including the previous W3 minutes and the percent successful total requests are greater than Q1 for the previous W1 minutes; the percent successful retry requests is greater than P since the last evaluation and queue length is less than Q2 for the last W2 hours not including the previous W3 minutes. Here, 408, util is normal and shopper is limited. When queue length is less than Q3 for the previous W2 hours and the percent successful requests has been greater than Q1 for the previous W1 minutes, the node states both revert to normal 402.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A high-volume transaction queuing for an ecommerce system comprising:
    a primary back-end processing platform;
    an order taker server for front-end processing of a transaction that submits the transaction to the primary back-end processing platform after conducting front-end processing;
    a memory device with computer readable program code stored thereon, the primary back-end processing platform, and the order taker server operatively coupled to the memory device;
    a communication device;
    a circuit breaker coupled to a primary back-end processing platform that processes transactions;
    a processing device operatively coupled to the memory device and the communication device, wherein the processing device is configured to execute the computer-readable code to:
    receive transactions from a user over a network;
    receive a response from the primary back-end processing platform;
    generate performance data indicative of the performance of the primary back-end processing platform substantially constantly, the performance data relating to the ability of the primary back-end processing platforms to process incoming transactions, the performance data includes a percentage of successful request-response transactions performed by the primary back-end processing platform over a first selected time;

incorporate generated performance data into a metrics database and calculate a primary back-end processing platform performance metric that determines the setting for the circuit breaker; and opening the circuit breaker in response to the primary back-end processing platform performance metric dropping below a first selected threshold indicative of poor performance, the circuit breaker, when in an open state, placing transactions in a queue to prevent transactions from coming to the primary back-end processing platform when the circuit breaker is in the open state; and directing the ecommerce system to stop sending transactions to the primary back-end processing platform when the circuit breaker is in the open state for a second selected amount of time, the transactions received during the second selected amount of time directed to the queue;

set a transaction status to queued and hold when the circuit breaker is in the open state;

sending transactions to the back-end processing platform in response to the second selected time elapsing as long as the back-end processing platform performance metric is above a second performance metric indicative of a healthy performance; and closing the circuit breaker; and sending customer communications indicative of an order being in process regardless of the back-end processing platform performance.

2. A high-volume transaction queuing system comprising:
a processor;
a memory communicatively coupled to a primary back-end transaction processing platform for processing transactions; and
an instruction set stored in memory that causes the processor to:
receive and pre-process a plurality of transactions;
send the pre-processed plurality of transactions to the primary back-end transaction processing computer platform for processing the plurality of transactions;
monitor at least one performance parameter of the primary back-end transaction processing computer platform for processing the plurality of transactions, the performance parameter relating to the ability of the primary back-end processing platforms to process incoming transactions;
in response to the performance parameter of the primary back-end transaction processing computer platform for processing the plurality of transactions indicating a distress condition, stopping the flow of at least a portion of the plurality of transactions, and placing the plurality of transactions in a queue in memory in response to the performance parameter for the primary back-end transaction processing computer platform being at a distress level;
after a selected cool down time, sending transactions back to the transaction processing computer platform for processing the plurality of transactions as long as the at least one performance parameter is above a threshold indicative of a healthy condition of the transaction processing computer platform for processing the plurality of transactions; and
a communication device generates customer transaction communications regardless of the condition of the transaction processing computer platform for processing the plurality of transactions.

3. The high-volume transaction queuing system of claim 2 wherein the instruction set stored in memory causes the processor to set an order status to queued for the at least a portion of the plurality of transactions in the queue in memory.

4. The high volume transaction queuing system of claim 2 wherein the instruction set stored in memory causes the processor to:
submit another plurality of transactions from the queue to the primary back-end transaction processing computer platform; and
monitor the at least one performance parameter for the primary back-end transaction processing computer platform for the plurality of transactions from the queue.

5. The high-volume transaction queuing system of claim 2 wherein the instruction set stored in memory causes the processor to:
submit another plurality of transactions from the queue to the primary back-end transaction processing computer platform;
monitor the at least one performance parameter for the primary back-end transaction processing computer platform for the plurality of transactions from the queue;
keep transactions in the queue in response to the performance parameter for the primary back-end transaction processing computer platform still being at a distress level.

6. The high-volume transaction queuing system of claim 2 wherein the instruction set stored in memory causes the processor to:
submit another plurality of transactions from the queue to the primary back-end transaction processing computer platform;
monitor the at least one performance parameter for the primary back-end transaction processing computer platform for the plurality of transactions from the queue;
send transactions in the queue to the primary transaction back-end processing computer platform in response to the performance parameter for the primary back-end transaction processing computer platform being above the threshold indicative of a healthy condition of the transaction processing computer platform for processing the plurality of transactions.

7. The high-volume transaction queuing system of claim 5 wherein the instruction set stored in memory further causes the processor to send received transactions to the primary back-end transaction processing computer platform in response to the performance parameter for the primary back-end transaction processing computer platform being above the threshold indicative of a healthy condition of the transaction processing computer platform for processing the plurality of transactions.

8. The high-volume transaction queuing system of claim 1 further comprising a circuit breaker under the control of an order taker, wherein the instruction set enables the circuit breaker to switch to at least three states, one of the states placing transactions in a queue in memory in response to the performance parameter for the primary back-end transaction processing computer platform being at a distress level.

9. The high-volume transaction queuing system of claim 8 wherein the instruction set switches the circuit breaker to a different state of the at least three states to direct transactions in a queue in memory to the primary back-end transaction processing computer platform in response to the performance parameter for the primary back-end transaction processing computer platform being above a distress level.

10. The high-volume transaction queuing system of claim 8 wherein the instruction set switches the circuit breaker to an intermediate to direct incoming transactions and queued transactions to the primary back-end transaction processing computer platform in response to the performance parameter for the primary back-end transaction processing computer platform being above a distress level.

11. The high-volume transaction queuing system of claim 2 wherein the instruction set determines the distress level on the basis of a percentage of successfully submitted transactions accomplished by the primary back-end transaction processing computer platform over a selected amount of time.

12. The high-volume transaction queuing system of claim 2 wherein the instruction set determines the distress level on the basis of a time necessary to process a submitted transaction at the primary back-end transaction processing computer platform over a selected amount of time.

13. A non-transitory machine-readable medium providing instructions that, when executed by a machine that includes a high-volume transaction queuing system, cause the machine to perform operations comprising:
receiving and pre-processing a plurality of transactions;
sending the pre-processed plurality of transactions to the primary back-end transaction processing computer platform for processing the plurality of transactions;
monitoring at least one performance parameter of the primary back-end transaction processing computer platform for processing the plurality of transactions, the performance parameter relating to the ability of the primary back-end processing platforms to process incoming transactions;
in response to the performance parameter of the primary back-end transaction processing computer platform for processing the plurality of transactions indicating a distress condition, stopping the flow of at least a portion of the plurality of transactions, and placing at least a portion of the plurality of transactions in a queue in memory in response to the performance parameter for the primary back-end transaction processing computer platform being at a distress level;
sending transactions back to the transaction processing computer platform for processing the plurality of transactions after a selected cool down time, and continuing to send transactions back to the transaction processing computer platform as long as the at least one performance parameter is above a threshold indicative of a healthy condition of the transaction processing computer platform for processing the plurality of transactions; and
generating customer transaction communications from a communication device regardless of the condition of the transaction processing computer platform for processing the plurality of transactions.

14. The non-transitory machine-readable medium of claim 13 providing instructions that, when executed by a machine, further cause the machine to perform operations of setting an order status to queued for the at least a portion of the plurality of transactions in the queue in memory.

15. The non-transitory machine-readable medium of claim 13 providing instructions that, when executed by a machine, cause the machine to perform operations to submit another plurality of transactions from the queue to the primary back-end transaction processing computer platform; and
monitor the at least one performance parameter for the primary transaction processing computer platform for the plurality of transactions from the queue.

16. The non-transitory machine-readable medium of claim 13 providing instructions that, when executed by a machine, cause the machine to perform operations to
submit another plurality of transactions from the queue to the primary back-end transaction processing computer platform;
monitor the at least one performance parameter for the primary back-end transaction processing computer platform for the plurality of transactions from the queue;
keep transactions in the queue in response to the performance parameter for the primary back-end transaction processing computer platform still being at a distress level.

17. The non-transitory machine-readable medium of claim 13 providing instructions that, when executed by a machine, cause the machine to perform operations to
submit another plurality of transactions from the queue to the primary back-end transaction processing computer platform;
monitor the at least one performance parameter for the primary back-end transaction processing computer platform for the plurality of transactions from the queue;
send transactions in the queue to the primary back-end transaction processing computer platform in response to the performance parameter for the primary back-end transaction processing computer platform being above the threshold indicative of a healthy condition of the transaction processing computer platform; and
send incoming transactions to the primary back-end transaction processing computer platform.

18. The non-transitory machine-readable medium of claim 17 providing instructions that, when executed by a machine, cause the machine to perform operations further comprising setting an order status to submitted for the plurality of transactions sent from the queue in memory to the primary back-end transaction processing computer platform.

19. The non-transitory machine-readable medium of claim 13 providing instructions that, when executed by a machine further comprise enabling a circuit breaker to one of at least three states, one of which places transactions in a queue in memory in response to the performance parameter for the primary transaction processing computer platform being at a distress level.

20. The non-transitory machine-readable medium of claim 19 providing instructions that, when executed by a machine further comprise pausing for a selected amount of time before sending transactions to the primary back-end processing platform.

21. The non-transitory machine-readable medium of claim 19 providing instructions that, when executed by a machine wherein monitoring the at least one performance parameter for the primary back-end transaction processing computer platform is substantially constant.

* * * * *